(12) United States Patent
Rustoni

(10) Patent No.: US 10,059,167 B2
(45) Date of Patent: Aug. 28, 2018

(54) LOCATION BASED REMOTE START

(71) Applicant: GM GLOBAL TECHNOLOGY OPERATIONS LLC, Detroit, MI (US)

(72) Inventor: Alexander K. Rustoni, Oxford, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 450 days.

(21) Appl. No.: 14/724,353

(22) Filed: May 28, 2015

(65) Prior Publication Data

US 2016/0347149 A1 Dec. 1, 2016

(51) Int. Cl.
*B60H 1/00* (2006.01)
*F02N 11/08* (2006.01)

(52) U.S. Cl.
CPC ..... *B60H 1/00771* (2013.01); *B60H 1/00778* (2013.01); *F02N 11/087* (2013.01)

(58) Field of Classification Search
CPC ............ B60H 1/00771; B60H 1/00778; F02N 11/087
USPC .......................................................... 165/202
See application file for complete search history.

(56) References Cited

U.S. PATENT DOCUMENTS

| | | | |
|---|---|---|---|
| 9,475,361 B2* | 10/2016 | Arai | B60H 1/00771 |
| 2007/0038364 A1* | 2/2007 | Lee | G01C 21/20 |
| | | | 701/532 |
| 2009/0030568 A1* | 1/2009 | Amano | B60K 6/445 |
| | | | 701/22 |
| 2010/0132388 A1* | 6/2010 | Oyobe | B60H 1/004 |
| | | | 62/157 |
| 2012/0074238 A1* | 3/2012 | Morita | F02D 13/0249 |
| | | | 237/5 |
| 2013/0079978 A1* | 3/2013 | Uyeki | B60H 1/00657 |
| | | | 701/36 |
| 2015/0129192 A1* | 5/2015 | Boss | B60H 1/00878 |
| | | | 165/202 |
| 2015/0338858 A1 | 11/2015 | Bates | |
| 2015/0345958 A1* | 12/2015 | Graham | G01C 21/343 |
| | | | 701/22 |
| 2016/0144689 A1* | 5/2016 | Miller | B60H 1/00964 |
| | | | 165/202 |

(Continued)

FOREIGN PATENT DOCUMENTS

WO WO2014106060 A1 7/2014

*Primary Examiner* — Raheena R Malik
(74) *Attorney, Agent, or Firm* — Reising Ethington, P.C.

(57) ABSTRACT

A method and system for controlling a climate characteristic in a vehicle cabin are provided that control the climate characteristic based, in part, on the location of the vehicle. In one embodiment, the method includes comparing a current location for the vehicle to a predetermined location for the vehicle and comparing a current date and current time to a predetermined date and predetermined time. The method further includes transmitting a climate control signal from a control module to a first subsystem of the vehicle if the current location meets a predetermined location condition relative to the predetermined location and the current date and current time meet predetermined date and time conditions relative to the predetermined date and predetermined time. The climate control signal is configured to cause the first subsystem to change a value of the climate characteristic.

14 Claims, 4 Drawing Sheets

(56) References Cited

U.S. PATENT DOCUMENTS

2016/0193895 A1* 7/2016 Aich ................ B60H 1/00657
                                                165/202
2016/0207375 A1* 7/2016 Gauthier ........... B60H 1/00778
2016/0280160 A1* 9/2016 MacNeille ............ G05B 15/02

* cited by examiner

US 10,059,167 B2

LOCATION BASED REMOTE START

FIELD

The present invention relates generally to a vehicle system. More specifically, the invention relates to a method and system to control a climate characteristic in a vehicle cabin based, in part, on the location of the vehicle.

BACKGROUND

Most modern vehicles include a system that allows a user to remotely start a vehicle for the purpose of conditioning the vehicle cabin to a comfortable level before the user enters the vehicle cabin. Where the ambient outside temperature is relatively cold, remotely starting the vehicle allows the cabin to be warmed to a predetermined level before the user enters the vehicle cabin. Similarly, when the ambient outside temperature is relatively hot, remotely starting the vehicle allows the cabin to be cooled to a predetermined level before the user enters the vehicle cabin.

Current remote start systems require a user to actuate a button on a key fob or similar device to initiate a remote start. Current remote start systems therefore require user intervention each time a remote start is desired. If the user forgets to initiate a remote start or lacks the time to do so, the value of the remote start capability is lost.

SUMMARY

According to one embodiment, there is provided a method for controlling a climate characteristic in a vehicle cabin. The method includes the step of comparing a current location for the vehicle to a predetermined location for the vehicle. The method further includes the step of comparing a current date and current time to a predetermined date and predetermined time. The method further includes the step of transmitting a climate control signal from a control module to a first subsystem of the vehicle if the current location meets a predetermined location condition relative to the predetermined location and the current date and current time meet predetermined date and time conditions relative to the predetermined date and predetermined time. The climate control signal is configured to cause the first subsystem to change a value of the climate characteristic.

According to another embodiment, there is provided a method for controlling a climate characteristic in a vehicle cabin. The method includes the step of comparing a current location for the vehicle to a predetermined location for the vehicle. The method further includes the step of comparing a current date and current time to a predetermined date and predetermined time. The method further includes the step of transmitting a climate control signal from a control module to a subsystem of the vehicle if the current location meets a predetermined location condition relative to the predetermined location and the current date and current time meet predetermined date and time conditions relative to the predetermined date and predetermined time. The climate control signal is configured to cause the subsystem to change a value of the climate characteristic. The method further includes the step of receiving at least one of a current operating parameter value of the vehicle and a current environmental parameter value for an operating environment of the vehicle. The method further includes the step of altering one of the predetermined time and the predetermined time condition responsive to the one of the current operating parameter value and the current environmental parameter value.

According to another embodiment, there is provided a system for controlling a climate characteristic in a vehicle cabin. The system includes a first subsystem of the vehicle configured to control the climate characteristic and a control module. The control module is configured to compare a current location for the vehicle to a predetermined location for the vehicle. The control module is further configured to compare a current date and current time to a predetermined date and predetermined time. The control module is further configured to transmit a climate control signal to the first subsystem if the current location meets a predetermined location condition relative to the predetermined location and the current date and current time meet predetermined date and time conditions relative to the predetermined date and predetermined time. The climate control signal is configured to cause the first subsystem to change a value of the climate characteristic.

DRAWINGS

Preferred exemplary embodiments will hereinafter be described in conjunction with the appended drawings, wherein like designations denote like elements, and wherein.

DESCRIPTION

The system and method described herein may be used to automatically condition the cabin of a vehicle without user intervention based, in part, on the vehicle's location. According to an exemplary embodiment, a user may establish and save a schedule (date and time) and location where remote starts should be initiated (e.g., each morning during a work week when the vehicle is at the user's home prior to leaving the home for a place of employment or each afternoon during a work week when the vehicle is at the place of employment prior to leaving the place of employment for home). If the vehicle is at the predetermined location selected by the user on the predetermined date and at the predetermined time, the vehicle cabin is conditioned to a predetermined level. As a result, the user does not have to intervene each time a start is required and the cabin can be conditioned to a desired level even where the user forgets to initiate a remote start or is unable to do so (e.g., because the user is too far away from the vehicle).

Figure 1:
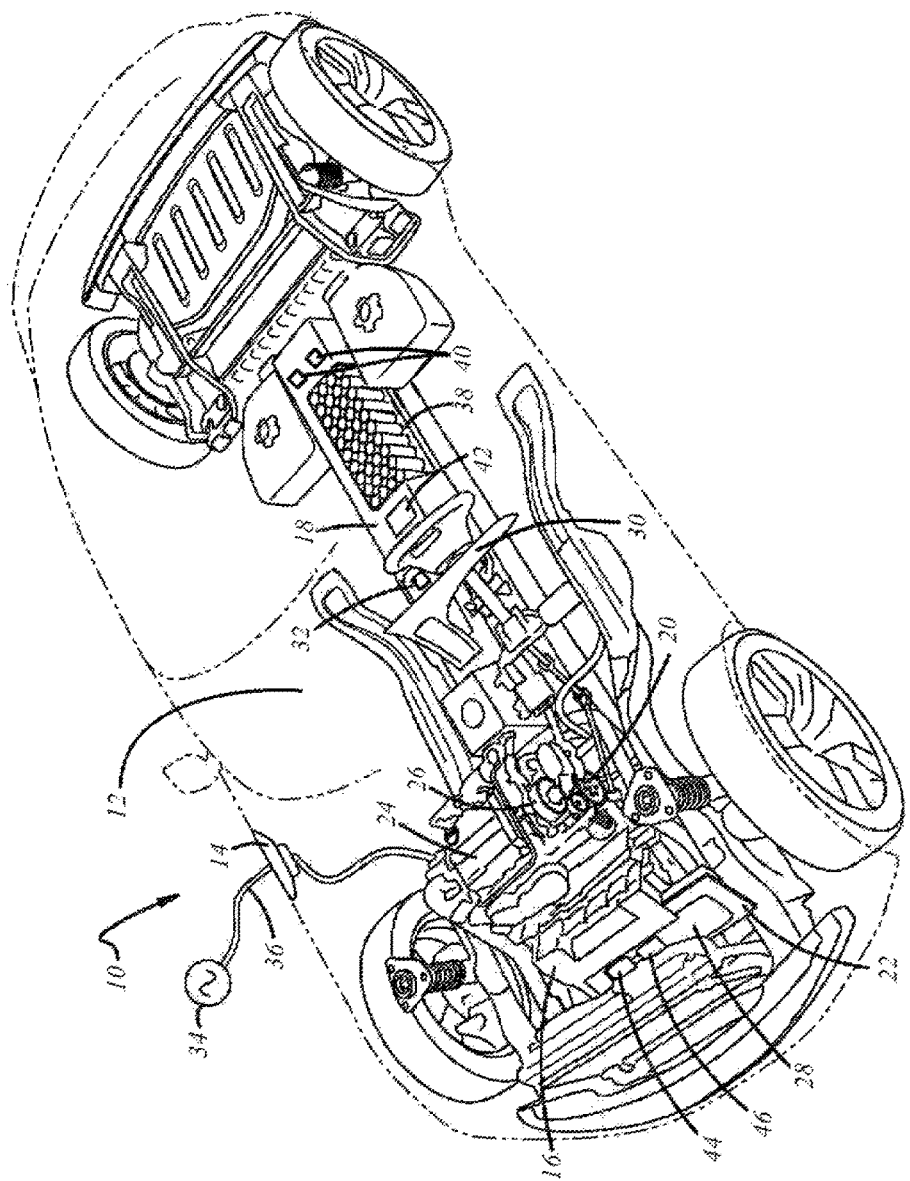
FIG. 1 is a schematic view of a vehicle including one embodiment of a system for controlling a climate characteristic in a cabin of the vehicle.

Referring now to the drawings wherein like reference numerals are used to identify identical components in the various views, FIG. 1 illustrates one embodiment of a vehicle 10 that may include a system for controlling a climate characteristic in a cabin 12 of the vehicle 10. In the illustrated embodiment, vehicle 10 comprises a plug-in hybrid electric vehicle (PHEV). It should be understood, however, that the system and method disclosed herein can be used with a wide variety of vehicles including battery electric vehicles (BEV) and vehicles relying on internal combustion engines. Vehicle 10 may include a power connection 14, a battery charger 16, a battery 18, an electric motor 20, an inverter/converter 22, an engine 24, a generator 26, a control module 28, a user interface 30, and a communications module 32 among other components.

Power connection 14 may comprise an electrical inlet configured to receive power from an external power source 34 through a power coupler 36. The power source 34 may comprise a public utility that provides electrical power via standard power outlets (e.g., 110 VAC or 220 VAC outlets), or it can be a portable generator such as the type that runs on natural gas, propane, gasoline, diesel, or the like. In one embodiment, power source 34 is a renewable power source, such as a remote charging station powered by energy from solar panels, wind turbines, hydroelectric means, biomass, etc. Power coupler 36 may sometimes be referred to as an electric vehicle supply equipment (EVSE) cordset. Power coupler 36, in one embodiment, may be a specialized cordset specifically designed for use with plug-in electric vehicles (such as those described in specifications SAE J1772 and J1773), which includes a first end, a cable or cord, a control unit, and a second end. The first end of power coupler 36 is a three-prong connection that plugs into a standard AC wall outlet and its second end is a specifically designed connection that plugs into power connection 14 on vehicle 10. The cable conducts or transmits electrical power from external power source 34 to vehicle 10, but may also convey one or more communication signals between a control unit of power coupler 36 and devices located on the vehicle, like control module 28. The control unit of power coupler 36 may include any number of electronic components including, but certainly not limited to, sensors, transceivers, processing devices, memory devices, contactors, switches, ground fault circuit interrupter (GFCI) components, as well as any other suitable component. In an exemplary embodiment, the control unit of power coupler 36 is powered by an external power source, monitors various conditions surrounding the power coupler (e.g., the presence of electrical power, the voltage and/or current of the electrical power, the temperature of the power coupler, etc.), and communicates with control module 28 regarding such conditions. Power connection 14 is not limited to any particular design, and may be any type of inlet, connection, socket, plug, port, receptacle, etc., including those that are based on conductive, inductive, or other types of electrical connections. Some of these connection types are covered by one or more international standards (e.g., IEC 62196 type 1-2 and mode 1-4, IEC 60309, SAE J1772, etc.). In an exemplary embodiment, power connection 14 is an electrical inlet located on the exterior of vehicle 10 so that it can be easily accessed (e.g., under a hinged door or flap), and includes one or more connections to battery charger 16 for conveying electrical power and one or more connections to control module 28 for communication. Other arrangements and connections are certainly possible.

Battery charger 16 may receive electrical power from a variety of sources, including external and/or internal power sources. In the case of an external power source, battery charger 16 may receive electrical power through power coupler 36 which connects external power source 34 to battery charger 16, as already explained. In the case of an internal power source, battery charger 16 may receive electrical power from regenerative braking, a motor-driven generator 26, or some other internal source via connections within the vehicle. Skilled artisans will appreciate that battery charger 16 may be provided according to any number of different embodiments, may be connected in any number of different configurations, and may include any number of different components, such as transformers, rectifiers, switching power supplies, filtering means, cooling means, sensors, control units and/or any other suitable components known in the art.

Battery 18 provides the vehicle 10 with electrical power and, depending on the particular embodiment, may be the primary electrical power source for vehicle 10 or may be used in conjunction with another power source for power supplementation purposes, to cite two examples. Many different battery types and arrangements may be used, including the exemplary one schematically shown here which includes a battery pack 38, one or more battery sensors 40, and a battery control unit 42. Battery pack 38 is a high-voltage battery pack and may include a collection of identical or individual battery cells connected in series, parallel, or a combination of both in order to deliver a desired voltage, amperage, capacity, power density and/or other performance characteristics. Generally, it is desirable to provide high power and energy densities, which has led to the development and use of many types of batteries including chemical, non-chemical, and others. Some examples of suitable battery types include those that are based on the following technologies: lithium ion, nickel metal hydride (NiMH), nickel cadmium (NiCd), sodium nickel chloride (NaNiCl), or some other battery technology. The battery pack 38 may provide approximately 40-600V, depending on its particular design and application. For example, a heavy truck using a two-mode hybrid system may require a high voltage battery pack capable of providing about 350V, where a lighter vehicle may only need about 200V. In another embodiment, battery 18 may be part of a belt-alternator-starter (BAS) or BAS-plus type system and thus only require a battery pack that provides about 40-110V. In any case, battery pack 38 should be designed to withstand repeated charge and discharge cycles and to receive electrical energy from external power source 34. Skilled artisans will appreciate that the system and method shown and described herein are not limited to any one particular type of battery or battery arrangement, as a number of different battery types could be employed.

Battery sensors 40 may include any combination of hardware and/or software components capable of monitoring battery conditions such as battery temperature, battery voltage, battery current, battery state of charge (SOC), battery state of health (SOH), etc. These sensors 40 may be integrated within unit 42 (e.g., an intelligent or smart battery), they may be external sensors located outside of the battery unit, or they may be provided according to some other known arrangement. Battery sensors 40 may monitor and determine battery conditions on a cell-by-cell basis, on an average or collective basis across a block or region of cells, on an entire battery pack basis, on a representative basis where certain cells are selected to represent the entire battery pack, or according to some other basis or technique known in the art. Output from battery sensors 40 may be provided to battery control unit 42, battery charger 16, control module 28, or some other appropriate device.

Battery control unit 42 may include a variety of electronic processing devices, memory devices, input/output (I/O) devices, and other known components, and may perform various control and/or communication related functions. For example, battery control unit 42 may receive sensor signals from the various battery sensors 40, package the sensor signals into an appropriate sensor message, and send the sensor message to control module 28 over a communication bus or the like. It is possible for battery control unit 42 to gather battery sensor readings and store them in local memory so that a comprehensive sensor message can be provided to control module 28 at a later time, or the sensor readings can be forwarded to module 28 or some other destination as soon as they arrive at battery control unit 42, to cite a few possibilities. Instead of sending the battery sensor readings to control module 28 for subsequent processing, it is possible for battery control unit 42 to process or analyze the sensor readings itself. In another capacity, battery control unit 42 can store pertinent battery characteristics and background information pertaining to the battery's cell chemistry, cell capacity, upper and lower battery voltage limits, battery current limits, battery temperature limits, temperature profiles, battery impedance, number or history of charge/discharge events, etc.

Electric motor 20 may use electrical energy stored in battery 18 to drive one or more vehicle wheels, which in turn propels the vehicle. While FIG. 1 schematically depicts electric motor 20 as a single discrete device, the electric motor may be combined with a generator (a so-called "mogen") or it may include multiple electric motors (e.g., separate motors for the front and rear wheels, separate motors for each wheel, separate motors for different functions, etc.), to cite a few possibilities. Motor 20 is not limited to any one particular type of electric motor, as many different motor types, sizes, technologies, etc. may be used. In one example, electric motor 20 includes an AC motor (e.g., a three-phase AC induction motor, a multi-phase AC induction motor, etc.), as well as a generator that can be used during regenerative braking. Motor 20 may alternatively comprise AC or DC motors, brushed or brushless motors, permanent magnet motors, etc., may be connected in any number of different configurations, and may include any number of different components, like cooling features, sensors, control units and/or any other suitable components known in the art.

Inverter/converter 22 may act as an intermediary between battery 18 and electric motor 20, as these two devices are often times designed to function according to different operational parameters. For example, during vehicle propulsion inverter/converter 22 may step-up the voltage from battery 18 and convert the current from DC to AC in order to drive electric motor 20, while during regenerative braking the inverter/converter may step-down the voltage generated by a braking event and convert the current from AC to DC so that it can be properly stored by battery 18. In a sense, inverter/converter 22 manages how these different operational parameters (i.e., AC versus DC, various voltage levels, etc.) work together. Inverter/converter 22 may include an inverter for DC to AC conversion, a rectifier for AC to DC conversion, a step-up converter or transformer for increasing the voltage, a step-down converter or transformer for decreasing the voltage, other suitable energy management components, or some combination thereof. In the exemplary embodiment shown, inverter and converter units are integrated into a single bi-directional device; however, other embodiments are certainly possible. It should be realized that inverter/converter 22 may be provided according to any number of different embodiments (e.g., with separate inverter and converter units, bi-directional or uni-directional, etc.), may be connected in any number of different configurations, and may include any number of different components, like cooling systems, sensors, control units and/or any other suitable components known in the art.

Engine 24 may drive generator 26 using conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, engine 24 is a small fuel-efficient engine (e.g., a small displacement, turbo-charged four-cylinder engine) that uses its mechanical output to turn generator 26. Skilled artisans will appreciate that engine 24 may be provided according to any number of different embodiments, may be connected in any number of different configurations (e.g., engine 24 could be part of a parallel hybrid system where the engine is also mechanically coupled to the vehicle wheels instead of exclusively being used to generate electricity), and may include any number of different components, like sensors, control units and/or any other suitable components known in the art.

Generator 26 is mechanically coupled to engine 24 so that the mechanical output of the engine 24 causes the generator 26 to create electrical power that may be provided to battery 18, electric motor 20, or both. It is worth noting that generator 26 may be provided according to any number of different embodiments (e.g., the generator of motor 20 and generator 26 may be combined into a single unit), may be connected in any number of different configurations, and may include any number of different components, like sensors, control units and/or any other suitable components known in the art. Generator 26 is not limited to any specific generator type or embodiment.

Control module 28 may be used to control, govern or otherwise manage certain operations or functions of vehicle 10 and, according to one exemplary embodiment, includes a processing device 44 and a memory device 46. Processing device 44 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 46 may include any type of suitable electronic memory means and may store a variety of data and information. This includes, for example: sensed battery conditions; look-up tables and other data structures; software, firmware, programs, algorithms, scripts, and other electronic instructions; component characteristics and background information, etc. Control module 28 may be electronically connected to other vehicle devices and modules via I/O devices and suitable connections, like a communications bus, so that they can interact as required. These are, of course, only some of the possible arrangements, functions and capabilities of control module 28, as others are certainly possible. Depending on the particular embodiment, control module 28 may be a stand-alone electronic module (e.g., a vehicle integration control module (VICM), a traction power inverter module (TPIM), a battery power inverter module (BPIM), etc.), it may be incorporated or included within another electronic module in the vehicle (e.g., a power train control module, an engine control module, a hybrid control module, etc.), or it may be part of a larger network or system (e.g., a battery management system (BMS), a vehicle energy management system, etc.), to name a few possibilities.

User interface 30 may include any combination of hardware, software and/or other components that enable a vehicle user to exchange information or data with the vehicle. This includes, for example, input components like a touch-screen display, a microphone, a keyboard, a pushbutton or other control where user interface 30 receives information from a vehicle user, as well as output components like a visual display, an instrument panel, or an audio system where user interface 30 provides information to the vehicle user. In some cases, user interface 30 includes components with both input and output capabilities, such as visual and audible interfaces. The audible interface may be part of an automated voice processing system that uses voice-recognition and/or other human-machine interface (HMI) technology. User interface 30 may be a stand-alone module; it may be part of an infotainment system or part of some other module, device or system in the vehicle; it may be mounted on a dashboard (e.g., with a driver information center (DIC)); it may be projected onto a windshield (e.g., with a heads-up display); it may be integrated within an existing audio system; or it may simply include an electronic connection or port for connecting with a laptop or other computing device, to cite a few examples. As explained below in more detail, user interface 30 may be used by the present method to exchange information between a vehicle user and vehicle 10 in a way that facilitates automatic conditioning of cabin 12. For instance, user interface 30 may receive various inputs from a user including dates, times and locations for conditioning cabin 12.

Communications module 32 may include any combination of hardware, software and/or other components that enable wireless voice and/or data communication between the vehicle and some other entity. According to one exemplary embodiment, communications module 32 includes a voice interface, a data interface and a GPS receiver, and may be bundled or integrated within a device such as a telematics unit. The voice interface enables voice communication to and/or from vehicle 10 and may include a cellular chipset (e.g., CDMA or GSM chipset), a vocoder, voice over IP (VOIP) equipment, and/or any other suitable device. The data interface, on the other hand, enables data communication to and/or from vehicle 10 and may include a modem (e.g., a modem using EVDO, CDMA, GPRS or EDGE technologies), a wireless networking component (e.g., one using an IEEE 802.11 protocol, WiMAX, BlueTooth, etc.), or any other suitable device. Depending on the particular embodiment, communications module 32 may communicate over a wireless carrier system (e.g., a cellular network), a wireless network (e.g., a wireless LAN, WAN, etc.), or some other wireless medium. The GPS receiver may receive signals from a constellation of GPS satellites and use these signals to determine vehicle position, as is well understood in the art.

The present method may use communications module 32 to exchange information between vehicle 10 and a vehicle user (e.g., via a call center, a website, a mobile communications device, etc.), and/or some other entity in a way that facilitates the automated conditioning of cabin 12. For example, communications module 32 may be used to receive scheduling information for cabin conditioning from a user including dates, times and locations entered via a website or mobile device and then sent to vehicle 10. Additionally or alternatively, module 32 may be used to receive weather information transmitted to vehicle 10. In one embodiment, communications module 32 acts as an alternative to user interface 30 for exchanging information between a vehicle user and vehicle 10. In another embodiment, communications module 32 and user interface 30 are both used to exchange such information. Other embodiments and arrangements are also possible. The method described below is not limited to any particular communications module or technology, and it may be used with devices other than the exemplary communications module shown and described here.

Figure 2:
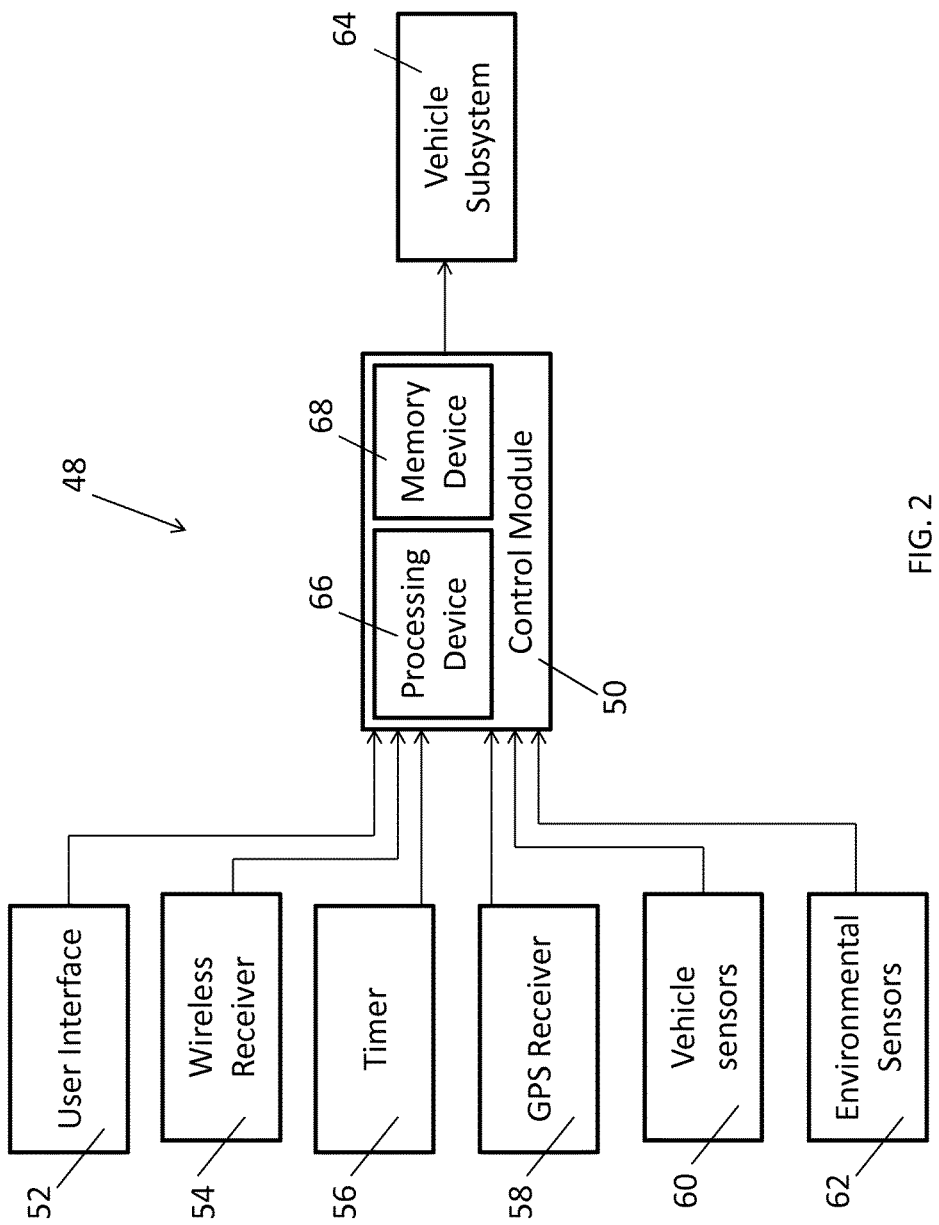
FIG. 2 is a schematic view of one embodiment of a system for controlling a climate characteristic in a vehicle cabin; and, FIGS. 3-4 are flowcharts illustrating embodiments of a method for controlling a climate characteristic in a vehicle cabin.

Referring now to FIG. 2, one embodiment of a system 48 for controlling a climate characteristic in cabin 12 of vehicle 10 is illustrated. System 48 includes a control module 50. System 48 may further include a plurality of input devices and systems that provide information and data to control module 50 including, for example, a user interface 52, a wireless receiver 54, timer 56, global positioning system (GPS) receiver 58, one or more vehicle operation sensors 60, and one or more environmental sensors 62. System 48 may further includes one or more vehicle subsystems 64 used to condition elements or spaces within cabin 12 or perform related functions.

Control module 50 may be used to control, govern, or otherwise manage conditions within cabin 12 of vehicle 10. Module 50 receives and processes signals generated by user interface 52, wireless receiver 54, timer 56, global positioning system (user interface 52, a wireless receiver 54, timer 56, GPS receiver 58, vehicle operation sensors 60, and environmental sensors 62 and generates control signals and commands used to control subsystems 64 in such a manner to control climate characteristics within cabin 12 such as temperature, humidity and other characteristics. Control module 50 may include a variety of electronic processing devices, memory devices, input/output (I/O) devices, and/or other known components, and may perform various control and/or communication related functions. In an exemplary embodiment, control module 50 includes a processing device 66 and a memory device 68. Processing device 66 may include any type of suitable electronic processor (e.g., a microprocessor, a microcontroller, an application specific integrated circuit (ASIC), etc.) that executes instructions for software, firmware, programs, algorithms, scripts, etc. including those stored on memory device 68. Memory device 68 may include any type of suitable electronic memory means and may store a variety of data and information. This includes, for example: predetermined dates, times and locations for automated conditioning of cabin 12, look-up tables and other data structures; software, firmware, programs, algorithms, scripts, and other electronic instructions; component characteristics and background information, etc. The method for controlling climate characteristics in cabin 12 described hereinbelow—as well as any other electronic instructions and/or information needed for such tasks—may also be stored or otherwise maintained in memory device 68. Depending on the particular embodiment, control module 50 may be a stand-alone vehicle electronic module, it may be incorporated or included within another vehicle electronic module such as control module 28, or it may be part of a larger network or system. Control module 50 may be electronically connected to other vehicle devices, modules and systems via a vehicle communications bus or other communication means and can interact with them when required.

User interface 52 enables a user of vehicle 10 to exchange information or data with control module 50 and may comprise a portion or configured version of user interface 30 described hereinabove. Like user interface 30, user interface 52 may include various input components like a touchscreen display, a microphone, a keyboard, a pushbutton or other control to receive information from a vehicle user and output components like a visual display, an instrument panel, or an audio system to provide information to the vehicle user. User interface 52 enables a user to establish a schedule for automated conditioning of cabin 12 by entering data and commands to establish predetermined dates and times during which, and locations at which, conditioning of cabin 12 will occur.

Receiver 54 is provided to receive a conventional remote start command from a vehicle user. Such commands will typically be transmitted from locations outside of the vehicle and using a key fob or other remote starting device configured to transmit a remote start command. Upon receipt of the remote start command, receiver 54 transmits the command to control module 50 for further processing. Control module 50 may then generate climate control signals or other commands to subsystems 64 in response to the remote start command in accordance with conventional algorithms.

Timer 56 provides current date and time information to control module 50. Timer 56 may, for example, comprise a quartz clock or other timing device mounted within vehicle 10. Alternatively, timer 56 may comprise a wireless transceiver configured to receive current date and time information transmitted to vehicle 10 from a remote source.

Global positioning system (GPS) receiver 58 provides current location information to control module 50. Receiver 58 is configured to receive signals from GPS satellites and process those signals to determine the current location of vehicle 10.

Sensors 60, 62, provide information regarding operating conditions of vehicle 10 and environmental conditions relating to the operating environment of vehicle 10. Sensors 60, 62 may be mounted on vehicle 10 and communicate with control module 50 through a vehicle communications bus. It should be understood, however, that system 48 may also or alternatively include sensors that are not mechanically connected to the vehicle including sensors that are affixed to other vehicles, infrastructure or even persons and that communicate information to control module 48. Sensors 60, 62 may be embodied in hardware, software, firmware or some combination thereof. Sensors 60, 62 may directly sense or measure the conditions for which they are provided, or they may indirectly evaluate such conditions based on information provided by other sensors, components, devices, modules, systems, etc. Sensors 60, 62 may be directly coupled to control module 48, indirectly coupled via other electronic devices, a vehicle communications bus, network, etc., or coupled according to some other arrangement known in the art. Sensors 60, 62 may be integrated within another vehicle component, device, module, system, etc. (e.g., sensors that are already a part of an engine control module (ECM), traction control system (TCS), electronic stability control (ESC) system, antilock brake system (ABS), etc.), may be stand-alone components, or they may be provided according to some other arrangement. In some instances, multiple sensors might be employed to sense a single parameter (e.g., for providing redundancy). It should be appreciated that the foregoing scenarios represent only some of the possibilities, as any type of suitable sensor arrangement may be used by system 48. Sensors 60, 62 may employ variety of different sensing techniques depending on the application.

Sensors 60 provide control module 50 with information regarding operation of vehicle 10. Sensors 60 may, for example, provide information on battery charge states, fuel or other fluid levels, the position or status of windows and door locks, etc. Sensors 62 provide control module 50 with one or more outside or environmental readings that may be used to detect and/or evaluate current environmental conditions that may affect vehicle 10. For example, environmental sensor 62 may include an outside temperature sensor, an outside humidity sensor, a precipitation sensor, or any other type of sensor that senses or gathers environmental readings. Environmental sensors 62 may determine environmental conditions by direct sensing and measurement of environmental readings, indirect determination of environmental readings by gathering data from other modules or systems in the vehicle, or by receiving wireless transmissions that include weather reports, forecasts, etc. from a weather-related service or website. In the last example, the wireless transmissions may be received at a telematics unit which then conveys the pertinent environmental data to control module 48.

Subsystems 64 are provided to condition elements or spaces within cabin 12 or perform related functions. The components, structure and operation of each subsystem 64 will vary depending on the function of the subsystem 64. One exemplary subsystem 64 comprises a vehicle cabin temperature control system (or heating, ventilation and air conditioning system) used to control air temperature and/or other climate characteristics within cabin 12. This subsystem may include conventional elements such as radiators, evaporators, condensors, heater core, chillers, blowers, motors, pumps, compressors, valves, etc. Other subsystems may include a steering wheel temperature control system, a vehicle seat temperature control system, or a rearview mirror defrost system. Still other subsystems 64 may be used to perform a variety of related functions in support of certain subsystems 64. For example, in embodiments that rely on activating power systems such as an internal combustion engine 24 to condition the cabin 12 (e.g., to provide heat), one subsystem 64 may include a starter motor used to start engine 24 or another power system.

Figure 3:
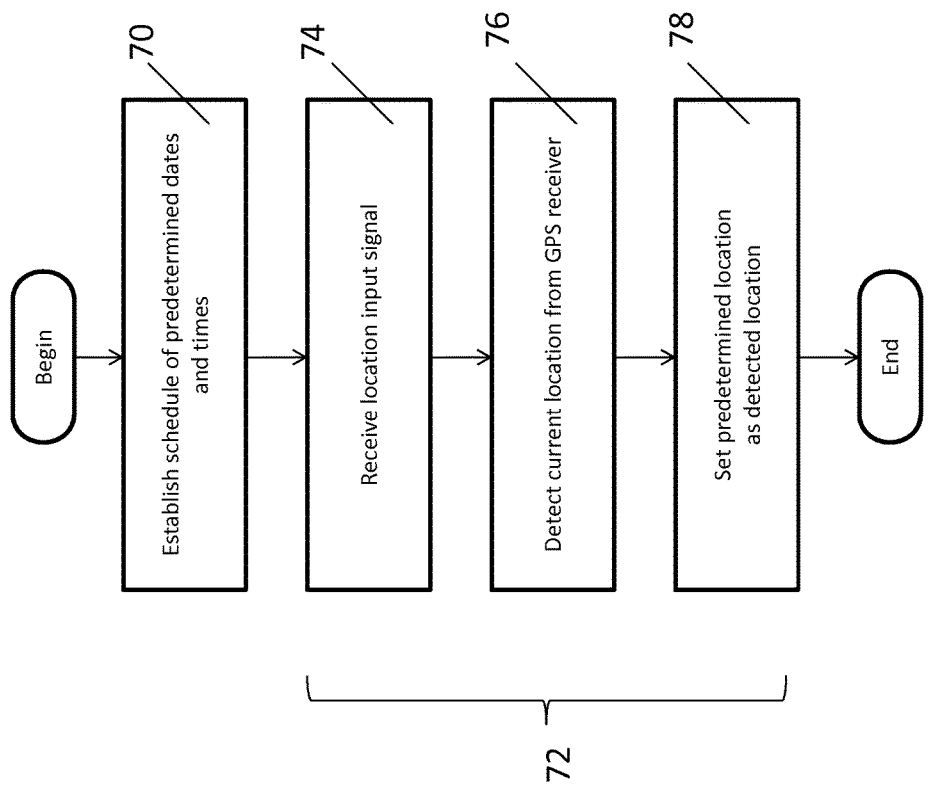

In accordance with one embodiment control module 50 is configured with appropriate programming instructions or code (i.e., software) to perform several steps in a method for controlling a climate characteristic in cabin 12 of vehicle 10. The code may be stored in memory device 68 of control module 50 and may be uploaded to memory device 50 from a conventional computer storage medium. Referring now to FIG. 3, the method may include several steps associated with a configuration mode of system 48 in which system 48 is configured by a user of vehicle 10. In step 70, module 50 establishes a schedule of predetermined dates and times during which cabin 12 will be conditioned. The schedule may be established in a variety of ways. In one embodiment, a user may input the schedule through user interface 52 (e.g., by selecting dates and times from predetermined options on a screen or entering the dates and times directly). In another embodiment, a user may in put the schedule remotely using a smartphone or computer and wirelessly transmitting the schedule to module 50 through communications module 32. In yet another embodiment, module 50 may be configured to establish the schedule based on past actions of the user. For example, module 50 may store information on remote start commands issued by a user and establish or modify a schedule based on the history of those commands (e.g., by averaging start times over a period of time or by establishing a default start time after a number of starts at or near the same time).

In step 72, module establishes a predetermined location or locations at which cabin 12 will be conditioned. The predetermined location may be established in various ways. In the illustrated embodiment, step 72 includes substeps 74, 76, and 78 in which module 50 receives a location input signal from user interface 52, retrieves a detected location from GPS receiver 58, and sets the predetermined location to the detected location. In other embodiments, the user can directly input the location through user interface 52 or using a smartphone or computer and transmitting the location to module 50 through communications module 32 or module 50 can be configured to establish the location based on past actions of the user as discussed above.

Figure 4:
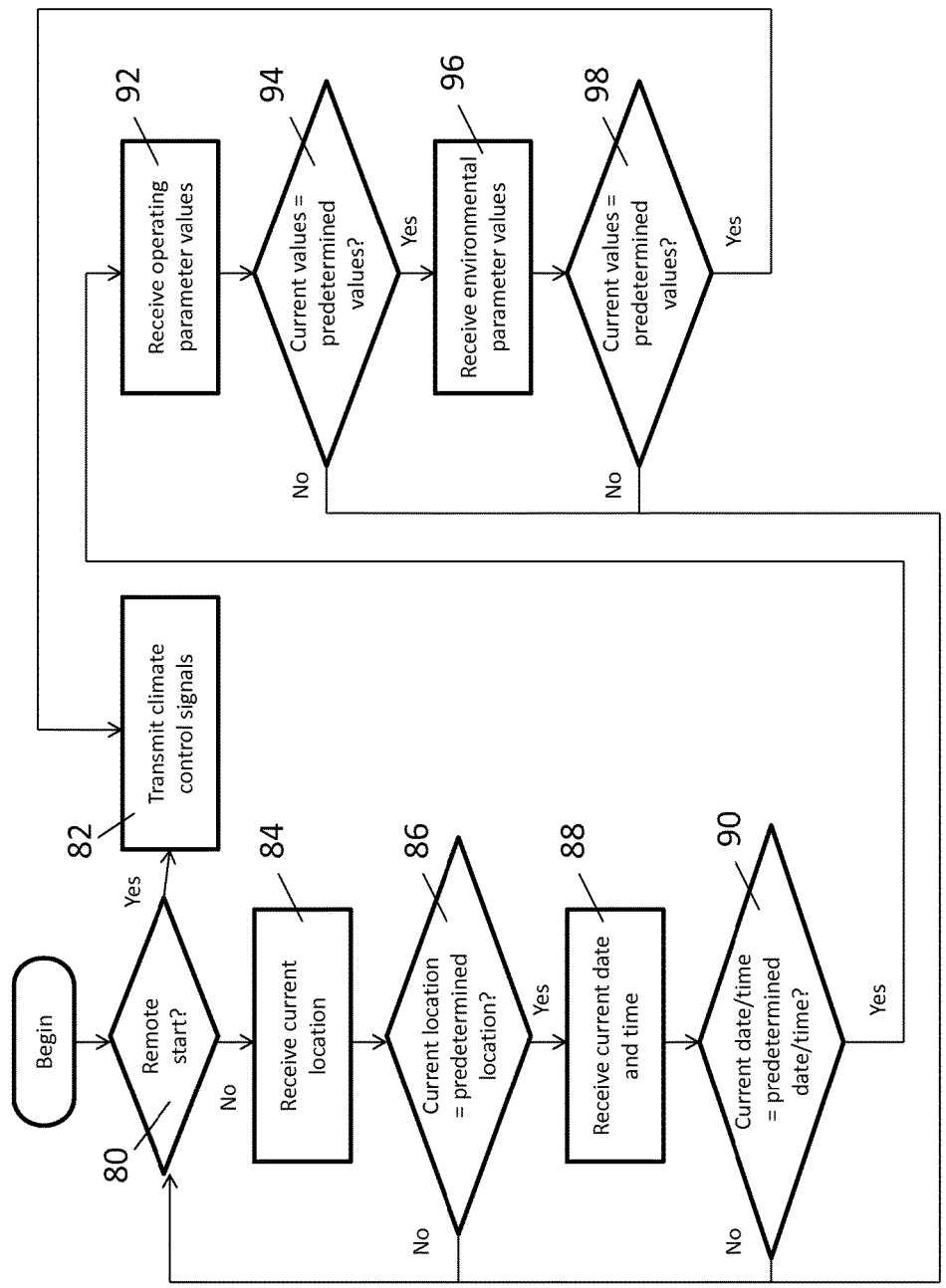

Referring now to FIG. 4, the method may further include several steps associated with an operating mode of system 48. In steps 80, 82, module may first determine whether a conventional remote start command has been received from a location outside of the vehicle and, if so, initiate conditioning of cabin 12 in accordance with the remote start command by transmitting climate control signals or other commands to subsystems 64. As discussed above, system 48 may include a receiver 54 through which conventional remote start commands can be transmitted to control module 50. Control module 50 may process the remote start command in accordance with conventional algorithms and transmit climate control signals or other commands to subsystems 64 in response.

In the absence of a conventional remote start command from the user, system 48 continuously monitors the date, the time and the location of vehicle 10 and compares the current date, time and location against predetermined dates, times and locations to determine whether conditioning of cabin 12 should begin. Accordingly, in steps 84, 86, control module 50 may receive a current location of vehicle 10 from GPS receiver 58 on vehicle 10 and compare the current location to a predetermined location where automated cabin conditioning is permitted to occur. Similarly, in steps 88, 90, control module 50 may receive a current date and current time (e.g., from timer 56) and compare the current date and time to predetermined dates and times when automated cabin conditioning is permitted to occur.

In addition to verifying the location of vehicle 10 and the date and time, control module 50 may be configured to verify that certain operational conditions are met before initiating conditioning of cabin 12 of vehicle 10. For example, depending on the power system for vehicle 10 and the mechanism for conditioning vehicle 10, a certain level of fuel or stored battery charge may be required to permit conditioning of cabin 12 without hindering other vehicle systems including those required for movement of vehicle 10. Therefore, module 50 may be configured to prevent conditioning of cabin 12 if the fuel level or battery charge state is below a predetermined threshold. As another example, module 50 may be configured to prevent conditioning of cabin 12 if the doors on vehicle 10 are not locked and/or the windows on vehicle 10 are not in a predetermined position (to prevent unauthorized access to and use of vehicle 10 and/or to prevent inefficient conditioning of cabin 12). Accordingly, in steps 92, 94, control module 50 may receive signals indicative of current operating parameter values for vehicle 10 and compare the current operating parameter values to predetermined operating parameter values. If the current operating parameter values do not meet predetermined operating conditions relative to the predetermined operating parameter values, control module 50 may prevent transmission of climate control signals or other commands to subsystems 64 even if the date, time and locations conditions for conditioning cabin 12 are otherwise met.

Control module 50 may also be configured to verity that certain environmental conditions are met before initiating conditioning of cabin 12 of vehicle 10. For example, environmental sensors 62 may indicate that cabin 12 is already appropriately conditioned (e.g., at a predetermined ambient temperature) such that automated conditioning of cabin 12 is not required. Accordingly, in steps 96, 98, control module 50 may receive signals indicative of current environmental parameter values for an operating environment of vehicle 10 and compare the current environmental parameter values to predetermined environmental parameter values. If the current environmental parameter values do not meet predetermined environmental conditions relative to the predetermined environmental parameter values, control module 50 may again prevent transmission of climate control signals or other commands to subsystems 64 even if the date, time and locations conditions for conditioning cabin 12 are otherwise met.

In the embodiment illustrated in FIG. 4, steps 80-98 comprise a sequential set of comparisons. It should be understood, however, that sequential order of steps 80-98 may vary or that multiple steps of steps 80-98 may be performed simultaneously. Further, in the embodiment illustrated in FIG. 4, certain comparisons ask whether a current value is equal to a predetermined value. It should be understood, however, that the current values may be compared to predetermined values using various predetermined conditions including, but not limited to, whether a current value is less or greater than a predetermined value or within a certain range of a predetermined value. Further, it should be understood that, in some cases, the relationship of current values to predetermined values may be considered in groups with different weights applied to different values in deciding whether to proceed.

In an alternative embodiment, rather than preventing transmission of climate control signals or other commands to subsystems 64, control module 50 may be configured to alter one or both of the predetermined time or the predetermined time condition responsive to a current operating parameter value or a current environmental parameter value. For example, an operating parameter value may indicate that vehicle 10 has a sufficient amount of fuel or battery charge to permit partial, but not complete, conditioning of cabin 12. In response, control module 50 may be configured to alter the predetermined time for conditioning of the vehicle so that conditioning begins later than it otherwise would to thereby limit the extent to which cabin 12 is conditioned. Alternatively, control module 50 may be configured to alter the predetermined time condition such that, for example, conditioning begins when the current time is within three minutes of the predetermined time as opposed to five minutes to again limit the extent to which cabin 12 is conditioned. Similarly, an environmental parameter value may indicate that vehicle 10 is nearly appropriately conditioned or that changing outside temperatures will reduce the need for conditioning. In response, control module 50 may be configured to alter the predetermined time or predetermined time condition as discussed above to limit the extent to which cabin 12 is conditioned.

Once control module 50 has determined that vehicle 10 is at an appropriate location for conditioning, and on an appropriate date and at an appropriate time (and, in certain embodiments, that no operating or environmental conditions should prevent conditioning of vehicle 10), module 50 may proceed to step 82 and transmit climate control signals or operating commands to subsystems 64 to condition cabin 12. In vehicles in which a power system such as an internal combustion engine must be started to condition cabin 12, control module 50 may transmit a start command from control module 50 to a starter motor of vehicle 10 if the current location meets a predetermined location condition relative to the predetermined location and the current date and current time meet predetermined date and time conditions relative to the predetermined date and predetermined time. The start command is configured to cause the starter motor to activate a power system of vehicle 10 such as engine 24. Similarly, module 50 may also be configured to transmit climate control systems to vehicle subsystems 64 responsible for conditioning elements or spaces within cabin 12 if the current location meets a predetermined location condition relative to the predetermined location and the current date and current time meet predetermined date and time conditions relative to the predetermined date and predetermined time. The climate control signals are configured to cause the subsystems 64 to change the values of various climate characteristics. For example, one subsystem 64 may comprise a heated steering wheel or a heated vehicle seat and climate control signals may be generated by module 50 and directed to those subsystems 64 to control and change the temperature of the wheel or seat. Another subsystem 64 may comprise a vehicle cabin temperature control system (or heating, ventilation and air conditioning system) used to control temperature within cabin 12 and climate control signals may be generated by module 50 and directed to the subsystem 64 to control and change the air temperature within cabin 12.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for controlling a climate characteristic in a vehicle cabin, comprising the steps of:
    determining whether a vehicle is located at a predetermined location for the vehicle by comparing a current location for the vehicle to the predetermined location for the vehicle, the predetermined location for the vehicle is a location where automated cabin conditioning is permitted to occur;
    comparing a current date and current time to a predetermined date and predetermined time;
    comparing a current fuel level or battery charge state value of the vehicle to a predetermined fuel level or battery charge state value, the current fuel level or battery charge state value represents a current fuel level or a current battery charge state of the vehicle; and
    transmitting a climate control signal from a control module to a first subsystem of the vehicle when it is determined that: (i) the vehicle is located at the predetermined location for the vehicle, (ii) the current date and current time meet predetermined date and time conditions relative to the predetermined date and predetermined time, and (iii) the current fuel level or battery charge state value meets the predetermined fuel level or battery charge state value, wherein the climate control signal is configured to cause the first subsystem to change a value of the climate characteristic.

2. The method of claim 1, further comprising the step of transmitting a start command from the control module to a starter motor of the vehicle if the vehicle is located at the predetermined location and the current date and current time meet the predetermined date and time conditions relative to the predetermined date and predetermined time, wherein the start command is configured to cause the starter motor to activate a power system of the vehicle.

3. The method of claim 1, further comprising the step of transmitting the climate control signal from the control module to the first subsystem responsive to receipt of a remote start command from a location outside of the vehicle by a wireless receiver in the vehicle.

4. The method of claim 1, further comprising the step of receiving the current location from a global positioning system receiver on the vehicle.

5. The method of claim 1, further comprising the steps of:
    comparing a current operating parameter value of the vehicle to a predetermined operating parameter value; and
    preventing transmission of the climate control signal if the current operating parameter value does not meet a predetermined operating condition relative to the predetermined operating parameter value.

6. The method of claim 5 wherein the predetermined operating parameter value comprises a locked condition of a door of the vehicle.

7. The method of claim 1, further comprising the steps of:
    comparing a current environmental parameter value for an operating environment of the vehicle to a predetermined environmental parameter value; and
    preventing transmission of the climate control signal if the current environmental parameter value does not meet a predetermined environmental condition relative to the predetermined environmental parameter value.

8. The method of claim 7 wherein the predetermined environmental value comprises a predetermined ambient temperature within the vehicle cabin.

9. The method of claim 1 wherein the first subsystem comprises a vehicle cabin temperature control system and the climate characteristic comprises a temperature of the vehicle cabin and the climate control signal is configured to cause the vehicle cabin temperature control system to change a value of the temperature of the vehicle cabin.

10. The method of claim 1, further comprising the step of transmitting an operating command to a second subsystem of the vehicle when the vehicle is located at the predetermined location and the current date and current time meet the predetermined date and time conditions relative to the predetermined date and predetermined time, wherein the operating command is configured to control the second subsystem.

11. The method of claim 10, wherein the second subsystem comprises a door lock and the operating command is configured to cause the door lock to assume a locked state.

12. The method of claim 1, further comprising the steps of:
    receiving a location input signal from a user interface;
    retrieving a detected location from a global positioning system receiver on the vehicle; and setting the predetermined location to the detected location.

13. The method of claim 1 wherein the climate characteristic comprises a temperature.

14. A method for controlling a climate characteristic in a vehicle cabin, comprising the steps of:
   determining whether the vehicle is located at a predetermined location for the vehicle, including comparing a current location for the vehicle to the predetermined location for the vehicle, wherein the predetermined location for the vehicle is a location where automated cabin conditioning is permitted to occur;
   comparing a current date and current time to a predetermined date and predetermined time; and
   transmitting a climate control signal from a control module to a subsystem of the vehicle when it is determined that the vehicle is located at the predetermined location for the vehicle and that the current date and current time meet predetermined date and time conditions relative to the predetermined date and predetermined time, wherein the climate control signal is configured to cause the subsystem to change a value of the climate characteristic;
   receiving at least one of a current operating parameter value of the vehicle and a current environmental parameter value for an operating environment of the vehicle; and
   altering one of the predetermined time and the predetermined time condition responsive to the one of the current operating parameter value and the current environmental parameter value.

* * * * *